United States Patent [19]
Files

[11] 3,792,745
[45] Feb. 19, 1974

[54] STEERING SYSTEM FOR TOOL-CARRYING VEHICLE

[75] Inventor: Thomas I. Files, Madison, Ind.

[73] Assignee: Rexnord Inc., Milwaukee, Wis.

[22] Filed: Mar. 10, 1972

[21] Appl. No.: 233,468

[52] U.S. Cl. .............................. 180/9.46, 180/79.2 R
[51] Int. Cl. ...................... B62d 11/20, B62d 55/10
[58] Field of Search....... 180/9.44, 9.46, 46, 79.2 C, 180/79.2 R, 6 H; 280/91 X, 95

[56] References Cited
UNITED STATES PATENTS

| | | | |
|---|---|---|---|
| 1,786,060 | 12/1930 | Greaves | 280/91 X |
| 1,804,816 | 5/1931 | Shelton | 180/9.46 |
| 1,918,564 | 7/1933 | Rorabeck | 180/9.46 |
| 3,306,390 | 2/1967 | Jamme | 180/46 |
| 3,572,458 | 3/1971 | Tax | 280/91 |
| 3,633,292 | 1/1972 | Ulrich | 180/79.2 R |
| 3,664,448 | 5/1972 | Hudis | 180/9.46 |
| 3,703,931 | 11/1972 | Page | 37/DIG. 1 |

Primary Examiner—Richard J. Johnson
Assistant Examiner—Reinhard J. Eisenzopf

[57] ABSTRACT

A vehicle includes a frame and four individual traction carriages. A vertical post and a horizontally extending leg connect each carriage and a corner of the frame. The legs are pivotally connected to the frame for horizontal adjustment and each post is telescopic. Power means for steering the carriages and "feedback" controls coordinate the parallel positioning of the carriages as required.

12 Claims, 7 Drawing Figures

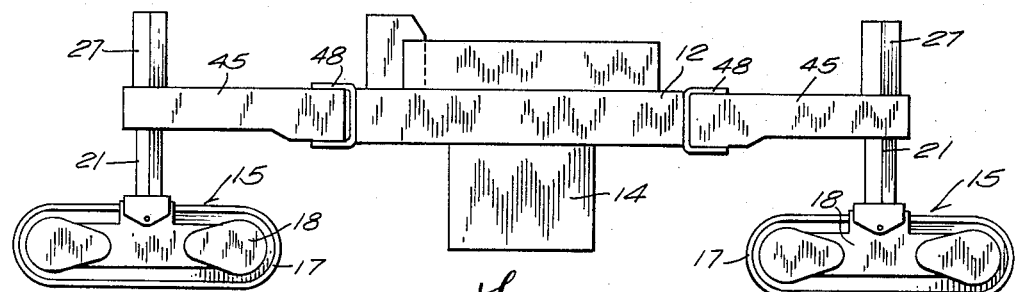
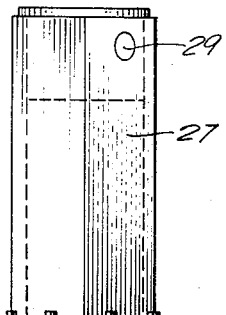
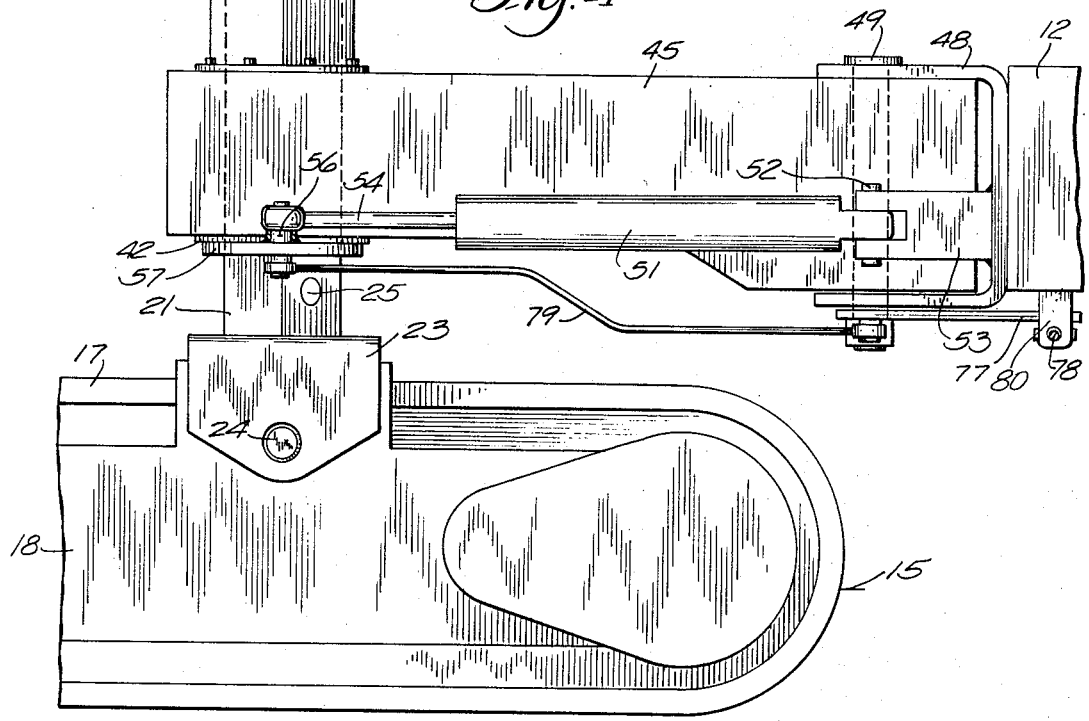

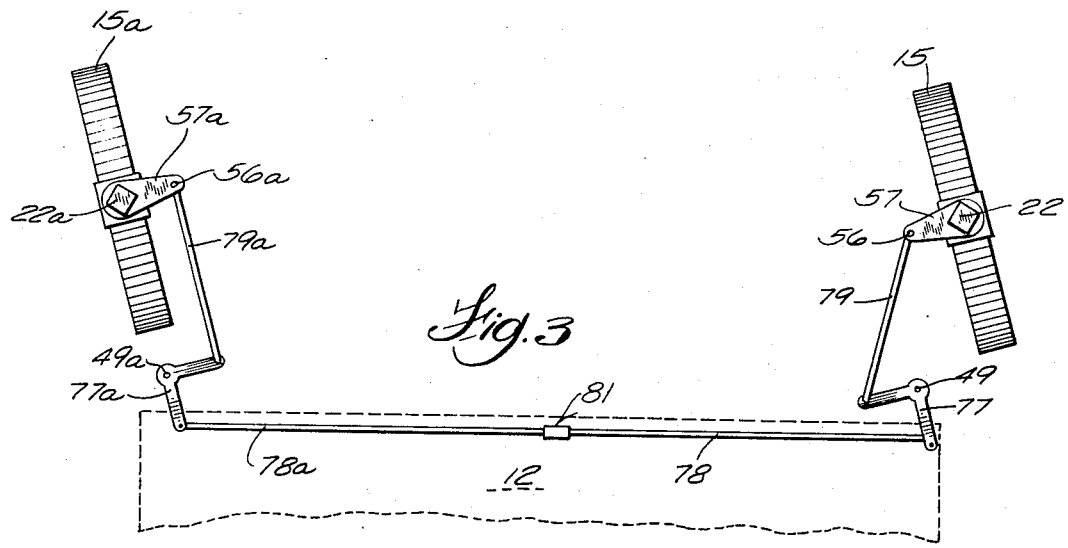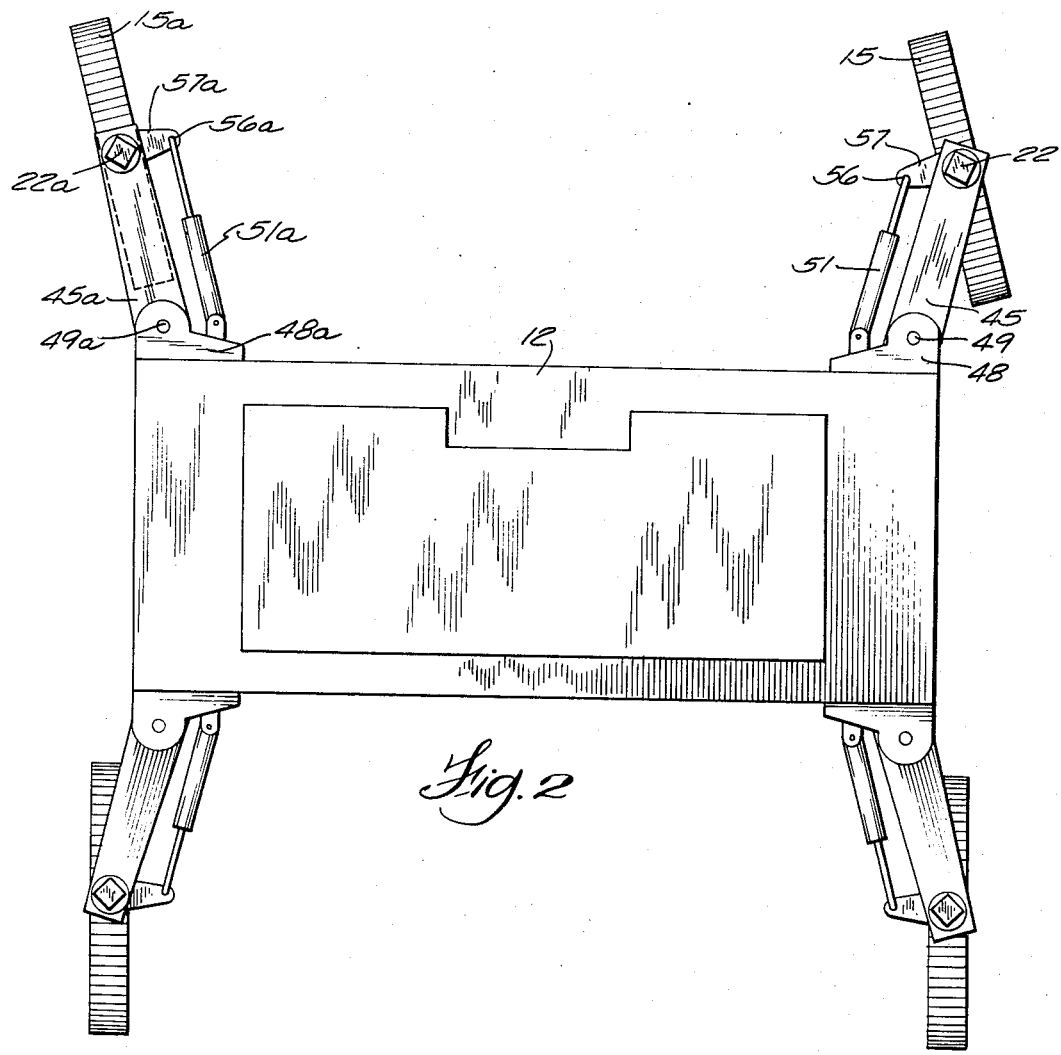

3,792,745

STEERING SYSTEM FOR TOOL-CARRYING VEHICLE

BACKGROUND OF THE INVENTION

The present invention is intended to provide an improved steering post construction and steering system for a certain type of vehicle. Such a vehicle is the subject of application Ser. No. 35,169 of Michael I. Hudis, filed May 6, 1970 and entitled Vehicle for Carrying Agricultural or Construction Tools and the Like, now U.S. Pat. No. 3,664,448 issued May 23, 1972.

In the prior art, as in the application referred to, the telescopic post comprises cylindrical tubes with the inner tube being both turnable and slidable vertically in the outer tube. When the tubes wear they become loose and vibration of the machine induces further wear. Also, the linkage for turning the inner tube must reach to the lower end of the tube with the result that the length of the linkage varies with variations in the height of the vehicle. Also, different lateral positions of the legs also requires that the steering linkage be disconnected and readjusted.

SUMMARY OF THE INVENTION

The vehicle includes a rectangular frame and four individual traction units each of which supports a vertical post and a horizontally extending leg. One end of each leg is connected to the frame by a vertical pin allowing horizontal swinging of the leg for the lateral adjustment of the respective traction unit. The other end of each leg is provided with a bearing in which the entire post is turnable. Each post is telescopic for adjusting the height of the frame and comprises two or more tubes in telescoping relation. The tubes are square and set diagonally respective the direction of the respective carriage so that they are rotationally interlocked by the tractive effort of the carriage. Power means turns the entire post in its bearing for steering and power means for the two forward traction units are controlled by linkages operating about the axes of said pins and bearings so that steering is unaffected by either adjustment referred to. The rear traction units may optionally be provided with a similar linkage.

BRIEF DESCRIPTION OF THE SEVERAL VIEWS OF THE DRAWINGS

FIG. 1 is a side view of the vehicle with the frame elevated to raise the tool from the ground.

FIG. 2 is a plan view of the entire machine. The two forward carriages or traction units turned for effecting a left turn of the vehicle.

FIG. 3 is a plan view of the forward traction units only and of the "feedback" control linkage connecting the same.

FIG. 4 is an enlarged side elevation of one traction unit in part and of the associated steering mechanism and including the bracket by which the leg is removably secured to the vehicle frame.

DESCRIPTION OF THE PREFERRED EMBODIMENT

Figure 5:
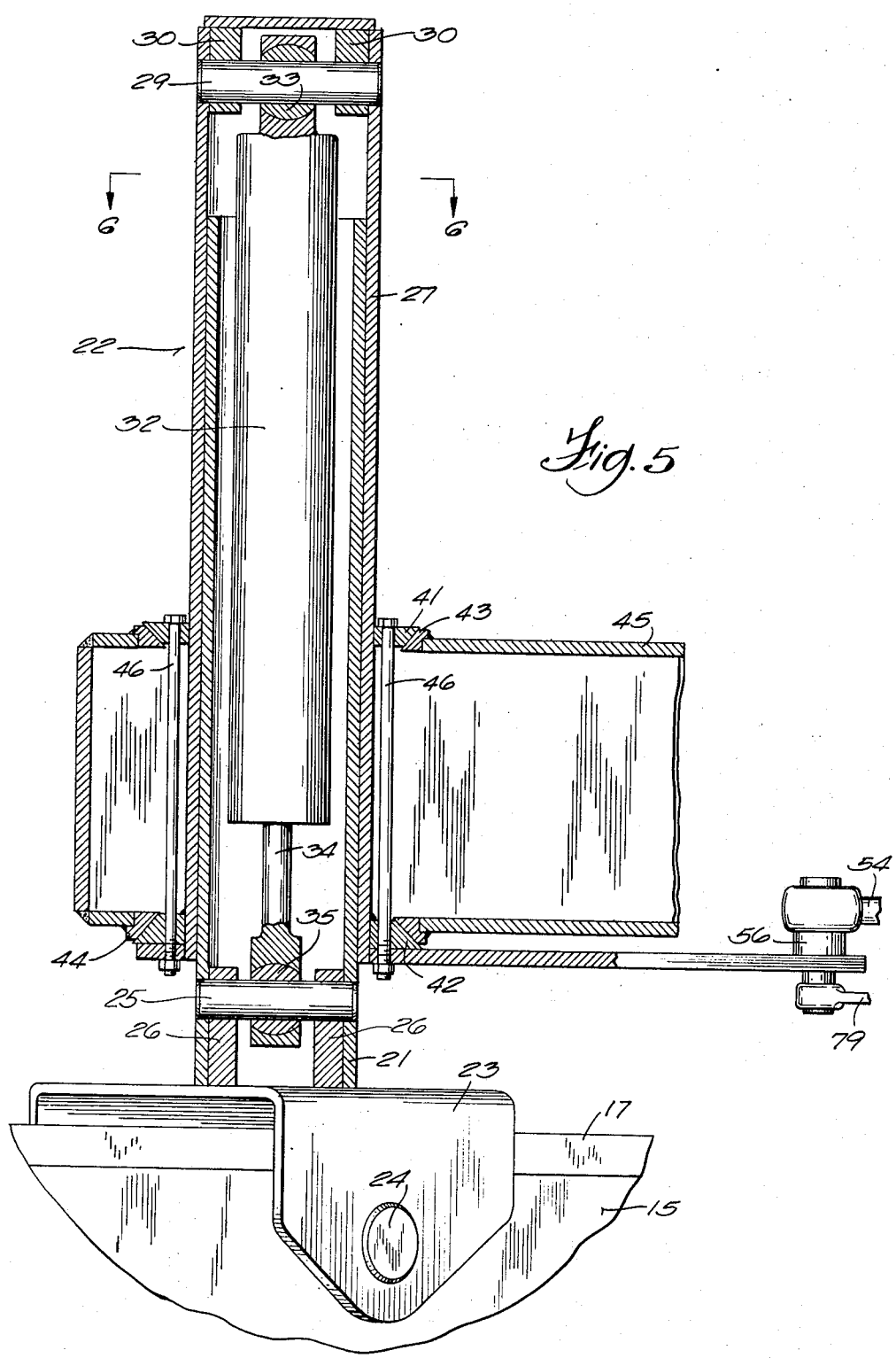
FIG. 5 is a further enlarged side elevation of the end of the leg and telescopic post with the latter broken away and sectioned to show its construction.

The vehicle 11 shown in the drawings includes the rectangular frame 12 which supports the operator's control station and engine power means and carries whatever tool 14 may be attached to the underside of the frame. The four corners of frame 12 are supported by similar right and left hand assemblies which are powered to propel and support the frame so that tool 14 is disposed at all times at the desired elevation, slope and attitude respecting the ground.

Figure 6:
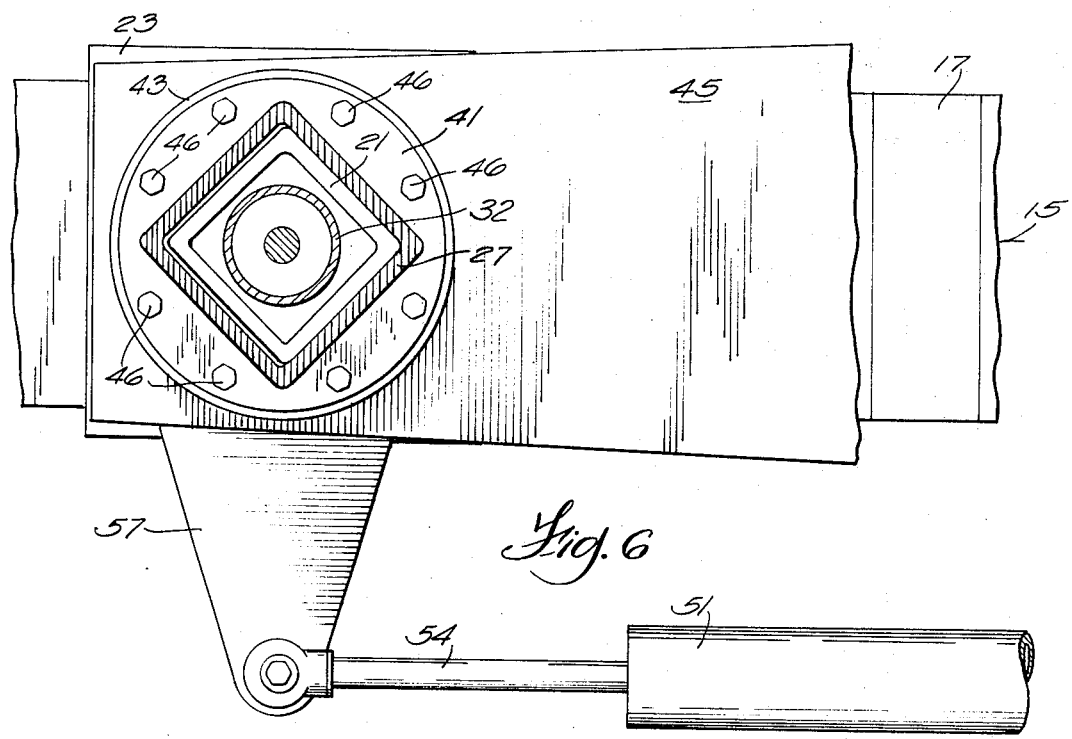
FIG. 6 is a similarly enlarged section taken on line 6—6 of FIG. 5. The space between the inner and outer square tubes is representative.

For convenience, only the forward right hand assembly as shown in FIGS. 4–6 will be described in detail. The traction unit 15 may be of any suitable type including, for example, the endless crawler treads 17 which support and operate around the carriage 18.

The lower end of the inner tube 21 of the telescopic post 22 carries the cross-pin 25 in the reinforcing blocks 26 and is fixed to the saddle 23 connected to carriage 18 by the pin 24. The upper end of tube 27 carries the cross-pin 29 in the reinforcing blocks 30.

Hydraulic lines, not shown, connect the hydraulic power system of the vehicle with upper and lower ends of the cylinder 32 to hold or raise and lower the forward right corner of frame 12. For that purpose, the upper end of the hydraulic cylinder 32 within post 22 is provided with the ball and socket bearing 33 and is mounted on cross-pin 29. Similarly, the lower end of the piston rod 34 is connected to cross-pin 25 by a bearing 35 whereby operation of cylinder 32 either lifts or lowers outer tube 27 in sliding relation on tube 21.

The lower end of tube 27 is fitted with the upper and lower collars 41 and 42 which are turnable in the aligned corresponding bearing rings 43 and 44 of the leg 45. Leg 45 is of a box-girder section and the rings are fitted and welded to the upper and lower plates of the leg at the outer end thereof. The lower collar 42 is welded to the tube 27 and the upper collar which is slidable on tube 27 is drawn downward by the tie-bolts 46 to provide the opposite frusto-conical bearing surfaces of the collars and rings with a uniformly tight fit.

According to the present invention, tubes 21 and 27 are of square section and may comprise rolled and seam welded tubes which are drawn to a square section with somewhat rounded corners. For a sliding fit the lower inner end of tube 27 and the upper outer end of tube 21 may be fitted with shims, not shown, and the telescopic post may comprise three such tubes if required to provide the desired range of elevation.

The fixed end of leg 45 fits between the upper and lower plates of the bracket 48 and is secured thereto by the vertical pin 49 which allows the projecting end of the leg to pivot laterally for the lateral positioning of the traction unit. Means, not shown, locks the leg in the selected position and other means, not shown, removably secures the bracket to frame 12.

The directional control of traction unit 15 is effected by the hydraulically operated cylinder 51 having one end connected by the pin 52 to the extension 53 of bracket 48. The end of the piston rod 54 is suitably connected as by the ball and socket device shown to the post 56 fixed on the end of the control arm 57 which extends toward the centerline of the machine. The larger end of arm 57 is suitably fixed to the lower end of tube 27 as by the tie bolts 46, or other means.

Preferably, when traction unit 15 is in the straight forward position respecting frame 12, the axes of posts 22 and 56 and pins 49 and 52 form a parallelogram so that the positioning of leg 45 may be effected while the vehicle is in motion and the swinging movement of the leg on pin 49 does not alter the direction of the traction unit. As shown, the left hand forward assembly similarly includes the left traction unit 15a, post 22a, leg 45a, bracket 48a, pin 49a, cylinder 51a, pin 52a, post 56a and control arm 57a.

Figure 7:
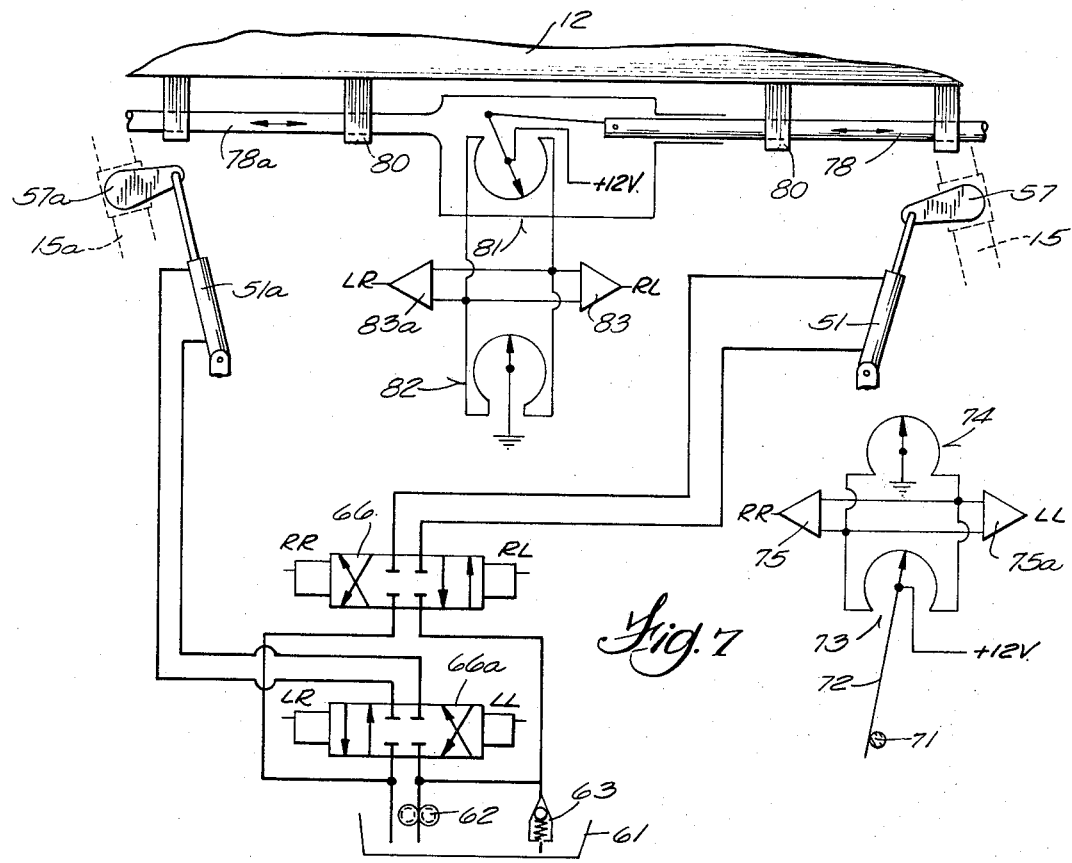
FIG. 7 is a diagram showing the hydraulic powered, electrically controlled steering system for the two forward traction units.

A representative hydraulic actuating system for cylinders 51 and 51a is shown diagrammatically in FIG. 7 and includes the sump 61, pump 62 and pressure control valve 63. Suitable hydraulic lines connect the three-way valves 66 and 66a with the pump and sump and with cylinders 51 and 51a respectively.

The valves 66 and 66a are operated by the solenoids which are labelled for convenience in accordance with their function. The controlled actuation of the solenoids is provided by separate first and second circuits.

The first circuit may be controlled manually by a switch not shown. In the usual operation of the vehicle the circuit is controlled by the guide wire 71 which extends alongside and parallel to the required path of the vehicle. The position of the vehicle relative to wire 71 is sensed by the wand 72 carried by the vehicle and which is connected to the shaft of potentiometer 73. Potentiometer 73 and adjustment potentiometer 74 form an electrical bridge to which amplifiers 75 and 75a are connected. The electrical potentials at the two inputs of each of the amplifiers are equal when wand 72 is at its null position. However, as shown by the position of wand 72, the vehicle is slightly to the right of its desired path of travel and so the unbalanced input causes amplifier 75a to actuate solenoid LL which moves the spool of valve 66a to direct fluid to the cylinder 51a and turn traction unit 15a to the left. This movement is followed immediately by the actuation of solenoid RL to turn traction unit 15 to the left.

For that purpose, a separate control linkage is provided between control arms 57 and 57a which includes the cranks 77 and 77a. Cranks 77 and 77a turn on the lower ends of pins 49 and 49a, respectively, or on separate mounting means having the same axes and are connected by the tie rod of two parts 78 and 78a which are supported slidably in the brackets 80 depending from the lower forward edge of frame 12. The control rods 79 and 79a also connect posts 56 and 56a of control arms 62 and 62a with cranks 77 and 77a so that any angularity of the traction units relative to each other changes the effective length of this control linkage.

The means of detecting the change in length of the control linkage may be machanically located anywhere in the linkage. For convenience, the detecting means comprises the potentiometer 81 which is carried by one part 78a of the tie rod and its control shaft is turned by the relative movement of the other part 78.

Potentiometer 81 and the adjustment potentiometer 82 form an electrical bridge to which amplifiers 83 and 83a are connected. The electrical potentials at each of the two inputs are equal when the two traction units 15 and 15a are parallel. However, as shown, traction unit 15a has been turned to the left as described so that the inputs of amplifier 83 cause the amplifier to actuate solenoid RL and the spool of valve 66 to be moved so that cylinder 51 turns traction unit 15 to the left. Thus, the right traction unit follows any left turn movement of the left traction unit. Similarly, if the vehicle is to be turned to the right, amplifier 83 first actuates solenoid RR to operate valve 66 and cause cylinder 51 to turn traction unit 15 to the right and amplifier 83a "follows" to actuate solenoid LR to operate valve 66a and cause cylinder 51a to turn traction unit 15a to the right.

As has been mentioned, the two rear assemblies of the vehicle are similar to the forward assemblies of the vehicle are similar to the forward assemblies but the rear traction units are normally set parallel to the straight forward direction and are turned only in maneuvering the vehicle with the tool 14 elevated as shown. However, a similar guided steering system may be provided the rear traction units.

Tool 14 may be a soil scarifier, a scraper or a roadway forming tool and whichever, a considerable forward tractive effort is required and provided by the four, individually powered traction units. The tractive force is transmitted through the square posts 22 which further according to the invention are set diagonally so that two opposite corner edges of each post are in the longitudinal plane of the traction unit.

This arrangement is such that with reference to tubes 21 and 27, the two forward sides of inner tube 21 are wedged between the lower inner sides of outer tube 27 and the upper rear sides of tube 21 are wedged between the rear inner sides of outer tubes 27. This provides the telescopic post with evident rigidity and causes the tubes to be firmly interlocked rotationally so that the steering effort is transmitted rotationally from tube 27 to tube 21 with no lost motion.

It is important to note that the control linkages between control arms 57 and 57a and cranks 77 and 77a form and remain parallelograms irrespective of the adjusted positions of legs 45 and 45a and irrespective of the steering positions of traction units 15 and 15a.

Also, because the control arms 57 and 57a are connected to the posts rather than to the saddles of the traction units, the operation of cylinders 51 and 51a and particularly the operation of the "feedback" control linkage (shown in FIGS. 3 and 7) is unaffected by any changes in the lengths of the telescopic posts as is required to maintain the tool 14 at the desired position regarding the ground.

Claims:

1. In a machine comprising a ground engaging tool and a vehicle having a frame to which the tool is attached, said vehicle further including individually powered, dirigible ground engaging traction units, a telescopic post supported by each unit, and bearings connecting said posts and said frame for the support of the frame, said posts being of adjustable length for the support of the frame and tool at the desired elevation, slope and attitude; each post comprising at least two interfitting square tubes and a powered extensible column connecting the upper end of the outer tube and the lower end of the inner tube and operable therein to adjust the effective length of the post, the inner tube being vertically slidable but rotationally fixed with respect to the outer tube and the lower projecting end of the inner tube being connected to and supported by the respective traction unit, each of said bearings including an outer ring and a collar turnable therein, each collar being fixed to the lower end of an outer tube and each ring being connected to a corner of the frame, and power means carried by the frame and connected to the outer tube to rotate the entire post and thereby effect the dirigible adjustment of the respective traction unit.

2. The combination of claim 1 wherein the tubes of each post are square and are arranged so that two diagonally opposite corners are located forwardly and rearwardly with reference to the tractive effort transmitted from the traction unit to the frame through the interfitting posts whereby the lower forward sides and the upper rear sides of the inner post bear against the corresponding inner areas of the outer post and turning of the collar and outer post directly turns the inner post and traction unit without any apparent lost motion while the machine is in operation.

3. The combination of claim 1 wherein said connecting means includes horizontally extending legs, one end of each leg being fitted with an outer ring, and vertical pins interconnecting the other end of each such leg and the frame for the lateral adjustment of the legs whereby said traction units are laterally adjustable as well as dirigible.

4. A steering system for the two forward laterally spaced individually power ground engaging traction units of a vehicle including an extensible vertical telescopic post supported by each traction unit, a rigid horizontally extending leg supported at one end thereof by each telescopic post, a bracket carried by the other end of each leg and including a vertical pivot for lateral adjustment of the one end of the leg, a rigid tool-carrying frame, and means attaching each such bracket to said frame for the support of said frame and the tool carried thereby; the improvement wherein each entire post is turnable in the respective leg and includes a steering arm and a power operated extensible rod which connects the end of the arm and the bracket such that the arm, leg, bracket and rod form a parallelogram and each carriage and leg may be laterally adjusted without altering the steering of the vehicle.

5. The combination of claim 4 wherein said means attaching each bracket to the frame allows each bracket to be readily detached from the frame as for transport of the vehicle, each such bracket, leg, post, traction unit and rod being adapted to remain assembled for such transport.

6. The steering system of claim 4 which further includes separate control means directly controlling each of said extensible rods and an interconnecting linkage, one control means being operable in direct response to a required change of direction of the vehicle and the other control means being operated by said connecting linkage and responsive to a change in the relative positions of the two traction units.

7. The combination of claim 4 wherein each post comprises at least two interfitting square tubes and a powered extensible column connecting the upper end of the outer tube and the lower end of the inner tube and operable therein to adjust the effective length of the post, the inner tube being vertically slidable but rotationally fixed with respect to the outer tube and the lower projecting end of the inner tube being connected to and supported by the respective traction unit, said one end of each leg including a bearing in which the respective outer tube is turnable, and the respective steering arms being connected to the lower ends of the outer tubes to rotate each entire post and thereby effect the dirigible adjustment of the respective traction units.

8. The combination of claim 7 wherein the tubes of each post are square and are arranged so that two diagonally opposite corners are located forwardly and rearwardly with reference to the tractive effort transmitted from the traction unit to the frame through the interfitting posts.

9. A steering system for the two forward ground engaging mobile units of a vehicle of the type including a tool carrying frame and horizontally extending legs, one end of each leg being supported by a mobile unit and pivotally connected thereto to allow the unit to be directionally turned about a vertical axis for such steering, the other end of each leg being pivotally connected to the frame for adjustment about a vertical axis to allow each mobile unit to be selectively positioned laterally respecting the tool, separate power means for turning each of said mobile units, control means responsive to a signal indicated by a required change of direction of the vehicle and connected to and controlling one only of said power means to turn the corresponding one mobile unit only, and follower means responsive to the turning of said one mobile unit and connected to and controlling the other power means to turn the other mobile unit and maintain the parallel relationship of the two mobile units.

10. The invention of claim 9 wherein the last named means includes a linkage comprising a control arm associated and turning with each mobile unit on its steering axis, a bell crank turnable on the adjustment axis of each leg, a rod connecting each arm and an arm of the corresponding bell crank, and a cross-rod connecting the other corresponding arms of the bell crank, said means being directly responsive to a change in the effective length of said linkage, the effective length of said arms being equal so that the effective length of the linkage is unaffected by any selected adjustment of said legs.

11. A steering system for two dirigible mobile support units of a vehicle, each of said mobile units have separately functioning power operated means to turn the respective units to the left and right, said power means together having four control inputs, guidance control means having separate directional outputs providing separate signals for directing the left and right turns of the vehicle, said directional outputs being connected to two only of said four control inputs, a mechanical linkage connecting the two mobile units and including sensing means having separate signal outputs, said sensing means being responsive to changes in the effective length of the linkage so as to provide no output signal while the mobile units are parallel, a first output signal when one unit is turned leftward of the other unit and a second output signal when one unit is turned rightward of the other unit, said separate outputs being connected only to the third and fourth control inputs of said power means.

12. The system of claim 11 wherein the several control inputs and the directional and signal outputs are electrical and are connected by conductors.

* * * * *